(12) United States Patent
Woo

(10) Patent No.: US 11,988,339 B2
(45) Date of Patent: May 21, 2024

(54) APPARATUS FOR FIXING PRESSURE VESSEL

(71) Applicant: HYUNDAI MOBIS Co., Ltd., Seoul (KR)

(72) Inventor: Myeong Nam Woo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 193 days.

(21) Appl. No.: 17/584,644

(22) Filed: Jan. 26, 2022

(65) Prior Publication Data

US 2022/0243873 A1 Aug. 4, 2022

(30) Foreign Application Priority Data

Jan. 29, 2021 (KR) ........................ 10-2021-0013603

(51) Int. Cl.
*F17C 13/08* (2006.01)
*E02F 9/08* (2006.01)

(52) U.S. Cl.
CPC .......... *F17C 13/084* (2013.01); *E02F 9/0883* (2013.01); *F17C 2205/0107* (2013.01); *F17C 2205/013* (2013.01); *F17C 2205/0169* (2013.01); *F17C 2205/0173* (2013.01); *F17C 2205/0196* (2013.01); *F17C 2270/0168* (2013.01); *F17C 2270/0184* (2013.01)

(58) Field of Classification Search
CPC ............ F17C 13/084; F17C 2205/0107; F17C 2205/013; F17C 2205/0169; F17C 2205/0173; F17C 2205/0196; F17C 2270/0168; F17C 2270/0184

USPC .................. 248/311.2, 230.1; 206/386, 446; 211/85.18, 85.8
See application file for complete search history.

(56) References Cited

U.S. PATENT DOCUMENTS

| 7,017,741 | B1 * | 3/2006 | Williamson | .......... F17C 13/084 206/386 |
| 8,016,300 | B2 * | 9/2011 | Cramer | .................... B65G 7/04 137/899.3 |
| 9,975,678 | B2 * | 5/2018 | Newman | ................. B65B 61/14 |
| 11,229,285 | B1 * | 1/2022 | Spadavecchia | ...... A47B 73/006 |

(Continued)

FOREIGN PATENT DOCUMENTS

| JP | 2014-047551 A | 3/2014 |
| JP | 5990257 B2 | 9/2016 |

(Continued)

OTHER PUBLICATIONS

Office Action issued in corresponding Korean Patent Application No. 10-2021-0013603 dated Jul. 14, 2022, with English translation.

(Continued)

*Primary Examiner* — Muhammad Ijaz
(74) *Attorney, Agent, or Firm* — MORGAN, LEWIS & BOCKIUS LLP

(57) ABSTRACT

The present disclosure relates to an apparatus for fixing a pressure vessel, the apparatus including: a frame part disposed to be separable from the subject and configured to support the pressure vessel; and a foothold disposed on the frame part, thereby obtaining an advantageous effect of simplifying a structure and improving a degree of design freedom and spatial utilization.

13 Claims, 10 Drawing Sheets

(56) References Cited

U.S. PATENT DOCUMENTS

| | | | | |
|---|---|---|---|---|
| 2014/0061065 A1* | 3/2014 | Girsh | ................... | B65D 19/44 |
| | | | | 206/386 |
| 2016/0113396 A1* | 4/2016 | Wilhelmsen | ......... | B65D 19/385 |
| | | | | 211/72 |
| 2016/0332514 A1* | 11/2016 | Arold | ................... | B60K 15/07 |
| 2018/0003346 A1* | 1/2018 | Chung | ................. | B29C 66/532 |
| 2022/0082212 A1* | 3/2022 | Woo | ....................... | F16M 11/22 |
| 2022/0243873 A1* | 8/2022 | Woo | ....................... | E02F 9/207 |
| 2022/0266685 A1* | 8/2022 | Godard | ................ | F17C 13/084 |

FOREIGN PATENT DOCUMENTS

| | | | |
|---|---|---|---|
| JP | 2018-162647 A | 10/2018 |
| KR | 10-2017-0102232 A | 9/2017 |
| KR | 10-2019-0022062 A | 3/2019 |

OTHER PUBLICATIONS

Korean Notice of Allowance dated Jan. 10, 2023, issued in corresponding Korean Patent Application No. 10-2021-0013603.

\* cited by examiner

APPARATUS FOR FIXING PRESSURE VESSEL

CROSS-REFERENCE TO RELATED APPLICATION

This application claims priority to and the benefit of Korean Patent Application No. 10-2021-0013603 filed in the Korean Intellectual Property Office on Jan. 29, 2021, the entire contents of which are incorporated herein by reference.

TECHNICAL FIELD

The present disclosure relates to an apparatus for fixing a pressure vessel, and more particularly, to an apparatus for fixing a pressure vessel, which may have a simple structure and improve a degree of design freedom and spatial utilization.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Meanwhile, various attempts have been made to apply the fuel cell system to construction machines (e.g., excavators) as well as passenger vehicles (or commercial vehicles).

The passenger vehicle operates mainly to travel on a road using a traveling device mounted with tires. Therefore, when the passenger vehicle is required to be refueled, a driver may drive the passenger vehicle to a charging station (hydrogen charging station) located in downtown and refuel the passenger vehicle without significant limitation in respect to a location of the charging station.

In contrast, the construction machine operates mainly to perform construction work (e.g., civil engineering work) at a construction site or in a remote area distant from the downtown and travels using a traveling device mounted with a caterpillar (endless track). For this reason, it is difficult for the construction machine to easily approach a charging station distant from the workplace. Thus, the construction machine is difficult to refuel in a timely manner when the fuel is exhausted.

Therefore, recently, various studies have been conducted to supplement fuel in a timely manner without limitation in respect to the workplace or the fuel charging station, but the study results are still insufficient. Accordingly, there is a need to develop a technology to supplement fuel in a timely manner without limitation in respect to the workplace or the fuel charging station.

SUMMARY

The present disclosure has been made in an effort to provide an apparatus for fixing a pressure vessel, which may have a simple structure and improve a degree of design freedom and spatial utilization.

In particular, the present disclosure has been made in an effort to provide a configuration in which a frame part may not only serve to support a pressure vessel but also serve to support a foothold (serve as a foothold frame).

The present disclosure has also been made in an effort to densely load a plurality of pressure vessels, minimize a loading space, and improve ability and stability to load pressure vessels.

The present disclosure has also been made in an effort to stably maintain an arrangement state of pressure vessels, improve stability and reliability, and reduce a risk of occurrence of a safety accident.

The present disclosure has also been made in an effort to supplement fuel in a timely manner without limitation in respect to a workplace or a fuel charging station.

The objects to be achieved by the embodiments are not limited to the above-mentioned objects, but also include objects or effects that may be understood from the solutions or embodiments described below.

An exemplary embodiment of the present disclosure provides an apparatus for fixing a pressure vessel, which fixes the pressure vessel to a subject, the apparatus including: a frame part disposed separably from the subject and configured to support the pressure vessel; and a foothold disposed on the frame part.

This is to facilitate a process of replacing the pressure vessel and supplement fuel in a timely manner.

That is, a construction machine to which a fuel cell system is applied operates mainly to perform construction work (e.g., civil engineering work) at a construction site or in a remote area distant from the downtown and travels using a traveling device mounted with a caterpillar (endless track). For this reason, it is difficult for the construction machine to easily approach a charging station distant from the workplace. Thus, the construction machine is difficult to refuel in a timely manner when the fuel is exhausted.

However, according to the embodiment of the present disclosure, the frame part configured to support the pressure vessel may be separated from the subject, such that the pressure vessel charged with fuel and the frame part configured to support the pressure vessel may be replaced as a whole. Therefore, it is possible to obtain an advantageous effect of supplementing fuel in a timely manner without limitation in respect to a workplace or a fuel charging station when it is necessary to supplement fuel.

Among other things, according to the embodiment of the present disclosure, the frame part may not only serve to support the pressure vessels but also serve to support the foothold (serve as the foothold frame). Therefore, no frame for supporting the foothold need to be added, which makes it possible to obtain an advantageous effect of simplifying the structure and improving the degree of design freedom and spatial utilization.

Moreover, in the embodiment of the present disclosure, a plurality of frame members, which constitute the frame part, are disposed on the single layer at the time of transporting the pressure vessels. Therefore, it is possible to obtain an advantageous effect of more densely loading the plurality of frame parts, minimizing the loading space, and improving the ability and stability to load the frame part (the pressure vessels).

In contrast, a second frame member is stacked on the upper portion of a first frame member at the time of mounting the pressure vessels onto the subject such as a construction machine. Therefore, the foothold disposed on a third frame member may be disposed in a stepwise manner to have a level difference from the foothold disposed on the second frame member. Therefore, the first frame member, the second frame member, and the third frame member may not only serve to support and protect the pressure vessels but also serve as a stepwise foothold frame for supporting the foothold.

The frame part may have various structures capable of supporting the pressure vessel on the subject.

For example, the frame part may include: a first frame member; and a second frame member disposed to be movable between a first position at which the second frame member is stacked on an upper portion of the first frame member and a second position at which the second frame member is disposed on the same layer as the first frame member, and the pressure vessels and the footholds may be respectively disposed on the first and second frame members.

According to the exemplary embodiment of the present disclosure, the frame part may include a third frame member disposed at one side of the first frame member such that the third frame member is disposed on the same layer as the first frame member, and the foothold disposed on the third frame member may be disposed to have a level difference from the foothold disposed on the second frame member.

In particular, the second frame member may be disposed at the same height as the first frame member at the second position.

According to the exemplary embodiment of the present disclosure, the apparatus for fixing a pressure vessel may include a hinge part configured to connect the first and second frame members to each other so that the first and second frame members are rotatable with respect to each other, and the second frame member may rotate about the hinge part from the first position to the second position.

According to the exemplary embodiment of the present disclosure, the apparatus for fixing a pressure vessel may include a locking part configured to selectively lock the second frame member to the first frame member when the second frame member is positioned at the first position.

As described above, the second frame member is locked to the first frame member (the state in which the second frame member is stacked on the upper portion of the first frame member is maintained) by means of the locking part when the second frame member is positioned at the first position. Therefore, the arrangement state of the second frame member may be stably maintained, and the arrangement state of the foothold disposed on the second frame member may be stably maintained. Therefore, it is possible to obtain an advantageous effect of improving the working stability of an operator who works with his/her foot put on the foothold.

The locking part may have various structures capable of locking the second frame member to the first frame member when the second frame member is positioned at the first position.

For example, the locking part may include: a locking pin disposed on the second frame member; and a locking module disposed on the first frame member and configured to selectively lock the locking pin. Alternatively, the locking pin may be disposed on the first frame member, and the locking module may be disposed on the second frame member.

According to the exemplary embodiment of the present disclosure, the apparatus for fixing a pressure vessel may include a locking bracket protruding from a bottom surface of the second frame member facing a top surface of the first frame member at the second position, and the locking pin may be supported by the locking bracket.

The locking module may have various structures capable of selectively locking the locking pin.

For example, the locking module may include: a first locking member rotatably disposed on the first frame member and having a first locking protrusion disposed at one end thereof; a second locking member rotatably disposed on the first frame member so as to intersect the first locking member and having a second locking protrusion disposed at one end thereof such that the first and second locking protrusions collectively define a locking hole for locking the locking pin; and an elastic member configured to elastically support rotations of the first and second locking members relative to the first frame member.

According to the exemplary embodiment of the present disclosure, the first frame member may have an accommodation portion that accommodates the locking bracket therein. Since the locking bracket is accommodated in the accommodation portion as described above, the second frame member may be in completely close contact with the first frame member in the state in which the first frame member is disposed at the first position. Therefore, it is possible to obtain an advantageous effect of more stably maintaining the arrangement state of the second frame member (the state in which the second frame member is disposed at the first position).

According to the exemplary embodiment of the present disclosure, the apparatus for fixing a pressure vessel may include a base block accommodated in the accommodation portion, and the first and second locking members may be rotatably coupled to the base block.

More particularly, a locking groove configured to lock the base block may be provided in the accommodation portion. As described above, the locking groove is provided in the accommodation portion, and the base block is locked by the locking groove. Therefore, it is possible to obtain an advantageous effect of inhibiting the base block from being separated from the first frame member by a load and external force applied to the second frame member (the locking pin).

According to the exemplary embodiment of the present disclosure, the apparatus for fixing a pressure vessel may include a first inclined guide portion included in the first locking protrusion and configured to guide the locking pin to the locking hole; and a second inclined guide portion included in the second locking protrusion and configured to guide the locking pin to the locking hole.

DETAILED DESCRIPTION

Figure 1:
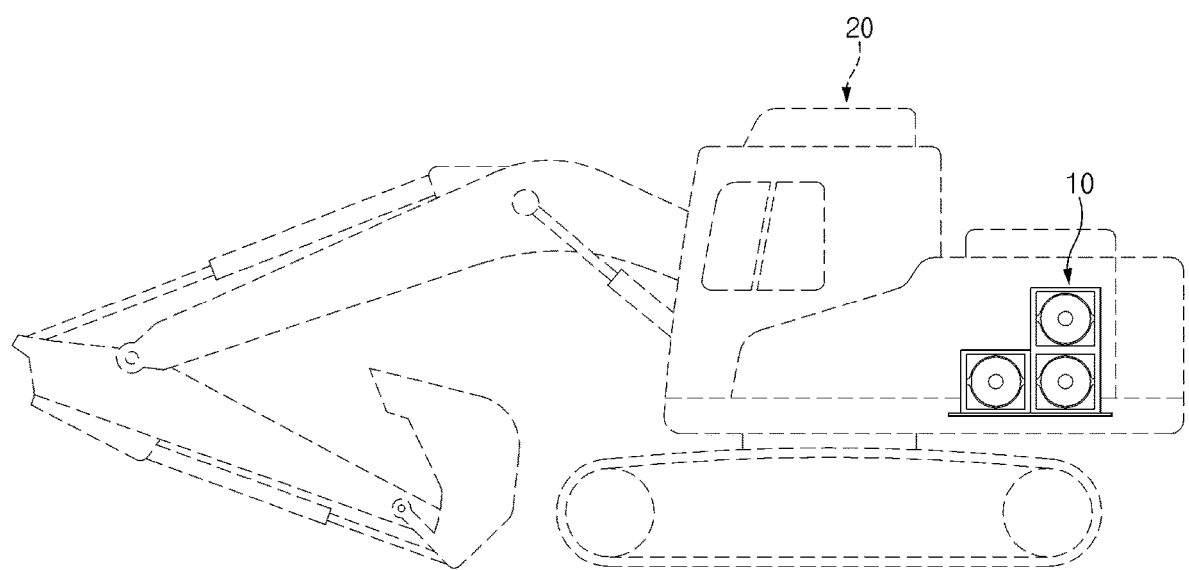
FIG. 1 is a view for explaining an application example of an apparatus for fixing a pressure vessel according to an embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 10, an apparatus 10 for fixing a pressure vessel 30 according to an embodiment of the present disclosure includes a frame part 100 disposed to be separable from a subject 20 and configured to support the pressure vessel 30, and footholds 600 disposed on the frame part 100.

For reference, the apparatus 10 for fixing the pressure vessel 30 according to the embodiment of the present disclosure may be used to mount (fix) the pressure vessel 30 to various subjects 20. The present disclosure is not restricted or limited by the type and structure of the subject 20 to which the pressure vessel 30 is fixed.

In particular, the apparatus 10 for fixing the pressure vessel 30 according to the embodiment of the present disclosure may be used to mount the pressure vessel 30 on a construction machine such as an excavator.

The pressure vessel 30 may store high-pressure compressed hydrogen therein. For example, the pressure vessel 30 may include a liner (not illustrated), a carbon fiber layer (not illustrated) configured to surround an outer surface of the liner, and a fiberglass layer (not illustrated) configured to surround an outer surface of the carbon fiber layer. The pressure vessel 30 may be selectively expanded or contracted depending on a pressure of hydrogen stored in the pressure vessel 30.

The frame part 100 serves to support the pressure vessel 30 mounted on the subject 20.

The frame part 100 may have various structures capable of supporting the pressure vessel 30 mounted on the subject 20. The present disclosure is not restricted or limited by the structure of the frame part 100.

For example, the frame part 100 may include a plurality of frame members individually and separably provided, and the pressure vessels 30 may be respectively supported on the frame members.

Hereinafter, an example will be described in which the frame part 100 includes a first frame member 110, a second frame member 120, and a third frame member 130, which are individually and separably provided, the second frame member 120 is selectively stacked on an upper portion of the first frame member 110 in an upward/downward direction, and the third frame member 130 is disposed at a lateral side of the first frame member 110. According to another embodiment of the present disclosure, the frame part may include one or two frame members or four or more frame members.

According to the exemplary embodiment of the present disclosure, the first frame member 110, the second frame member 120, and the third frame member 130 may surround the pressure vessels 30 to protect the pressure vessels 30.

For example, the first frame member 110, the second frame member 120, and the third frame member 130 may each have an opened quadrangular casing structure opened in all directions. The pressure vessel 30 may be accommodated in each of the first frame member 110, the second frame member 120, and the third frame member 130.

According to the exemplary embodiment of the present disclosure, the apparatus 10 for fixing the pressure vessel 30 may include clamp members (not illustrated) configured to fix the pressure vessel 30 to the frame part 100.

According to the exemplary embodiment of the present disclosure, the clamp members configured to fix the pressure vessels 30 may be respectively disposed on the first frame member 110, the second frame member 120, and the third frame member 130.

The clamp member may have various structures capable of fixing the pressure vessel 30 to the frame part 100 (e.g., the first frame member). The present disclosure is not restricted or limited by the structure of the clamp member.

For example, the clamp member may include a first clamp body (not illustrated) configured to surround a part of an outer peripheral surface of the pressure vessel 30, a second clamp body (not illustrated) configured to surround another part of the outer peripheral surface of the pressure vessel 30, and a fastening member (not illustrated) configured to fasten the first clamp body and the second clamp body.

For example, the first and second clamp bodies may each be made by bending a band-shaped member made of a metallic material in an approximately semicircular shape.

Figure 2:
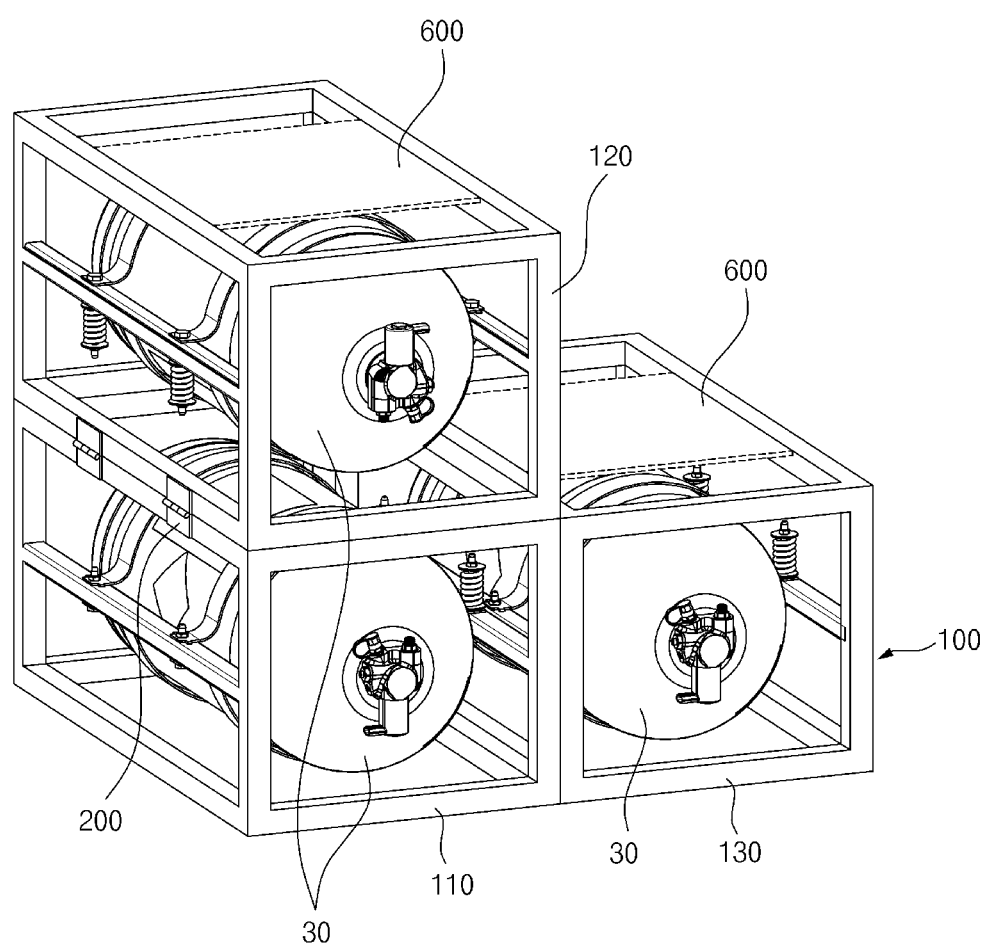
FIGS. 2 and 3 are views for explaining the apparatus for fixing a pressure vessel according to the embodiment of the present disclosure.
Figure 3:
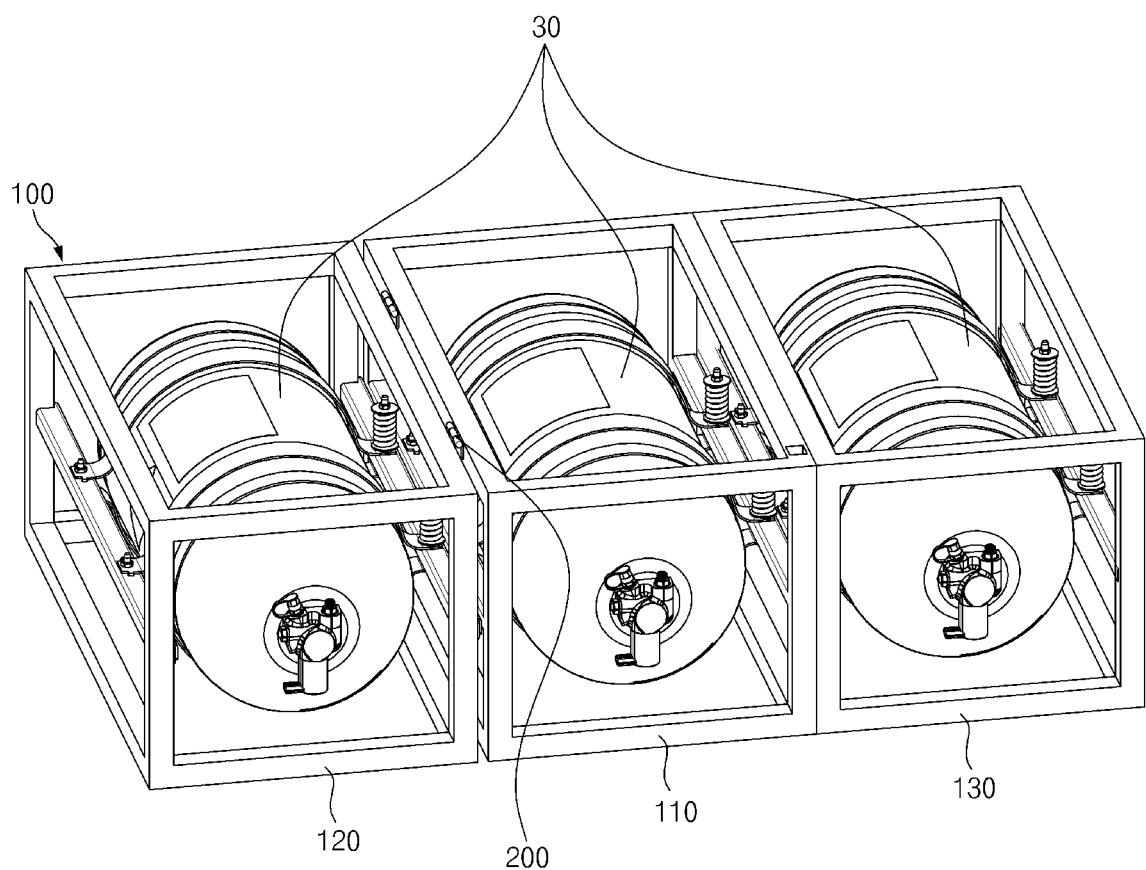
Figure 4:
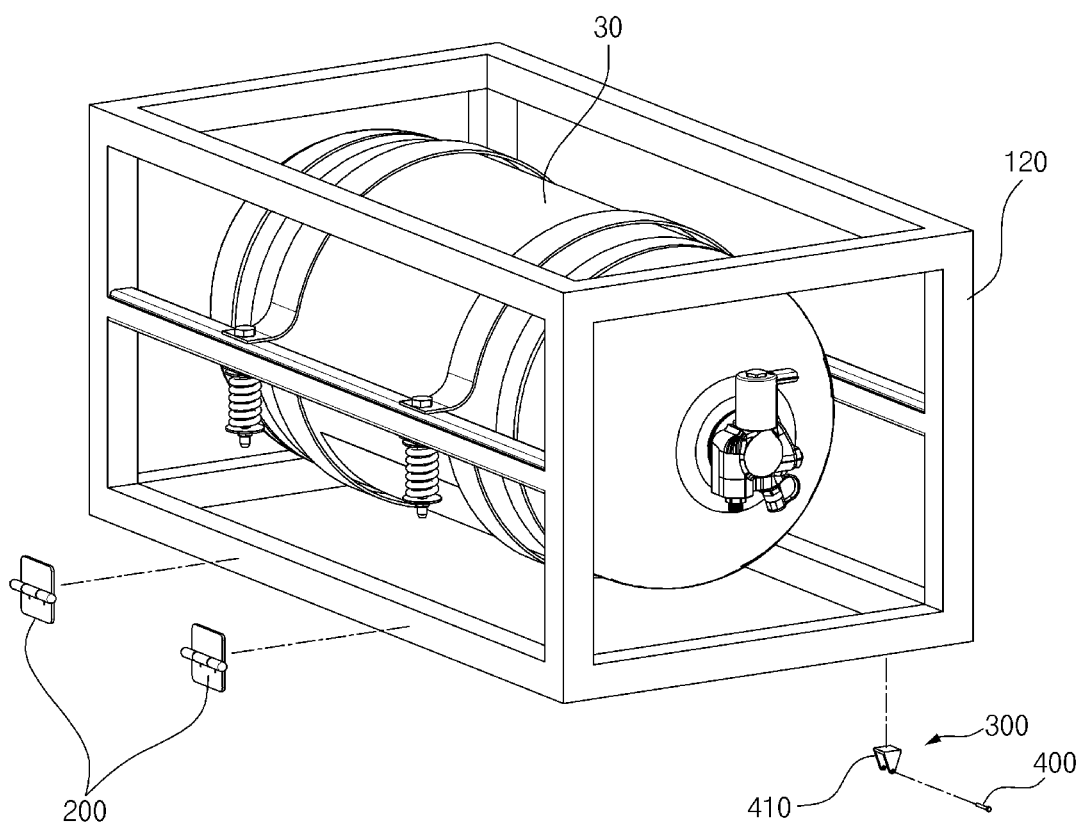
FIGS. 4 to 6 are views for explaining a locking part of the apparatus for fixing a pressure vessel according to the embodiment of the present disclosure.
Figure 5:
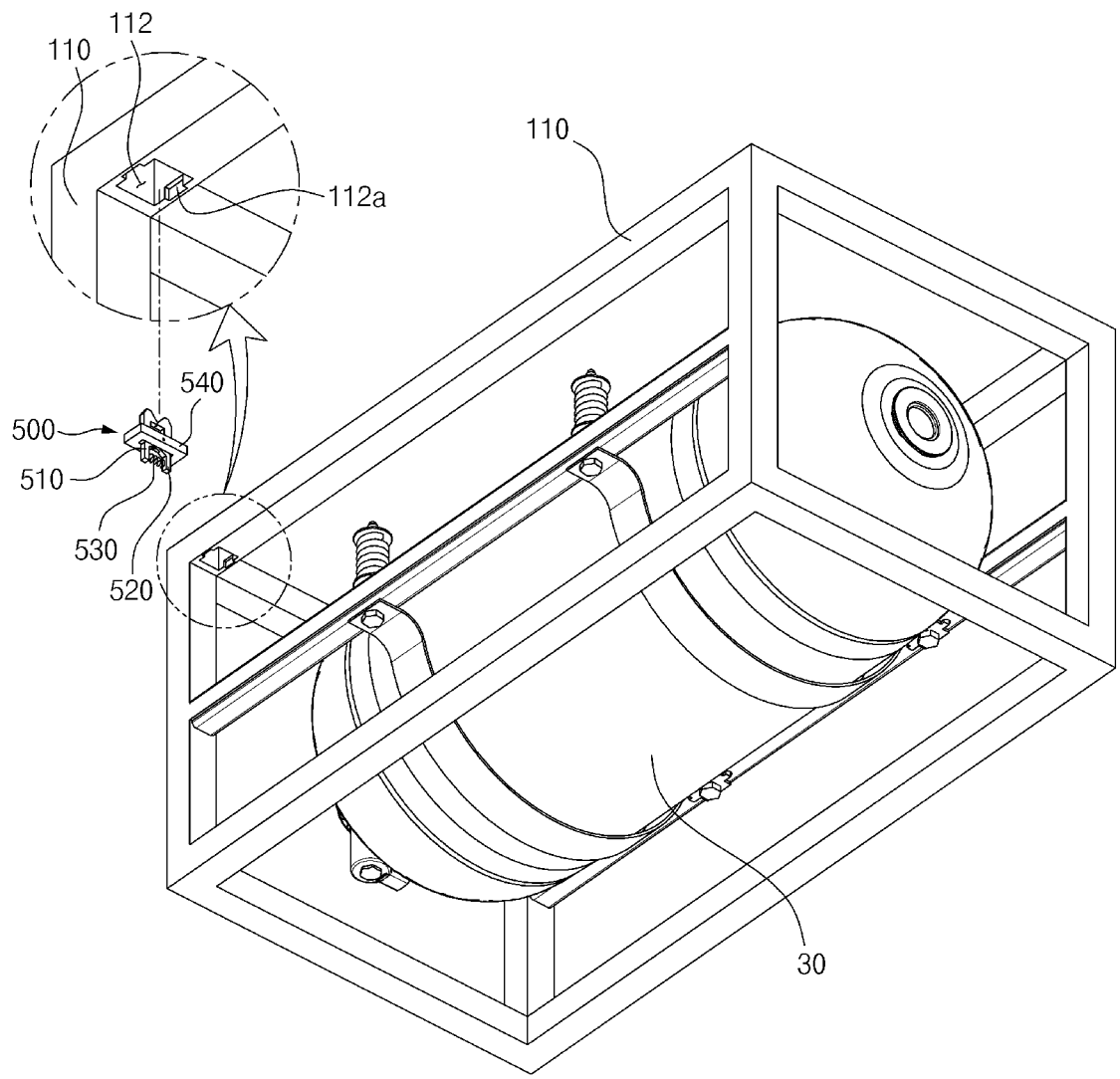
Figure 6:
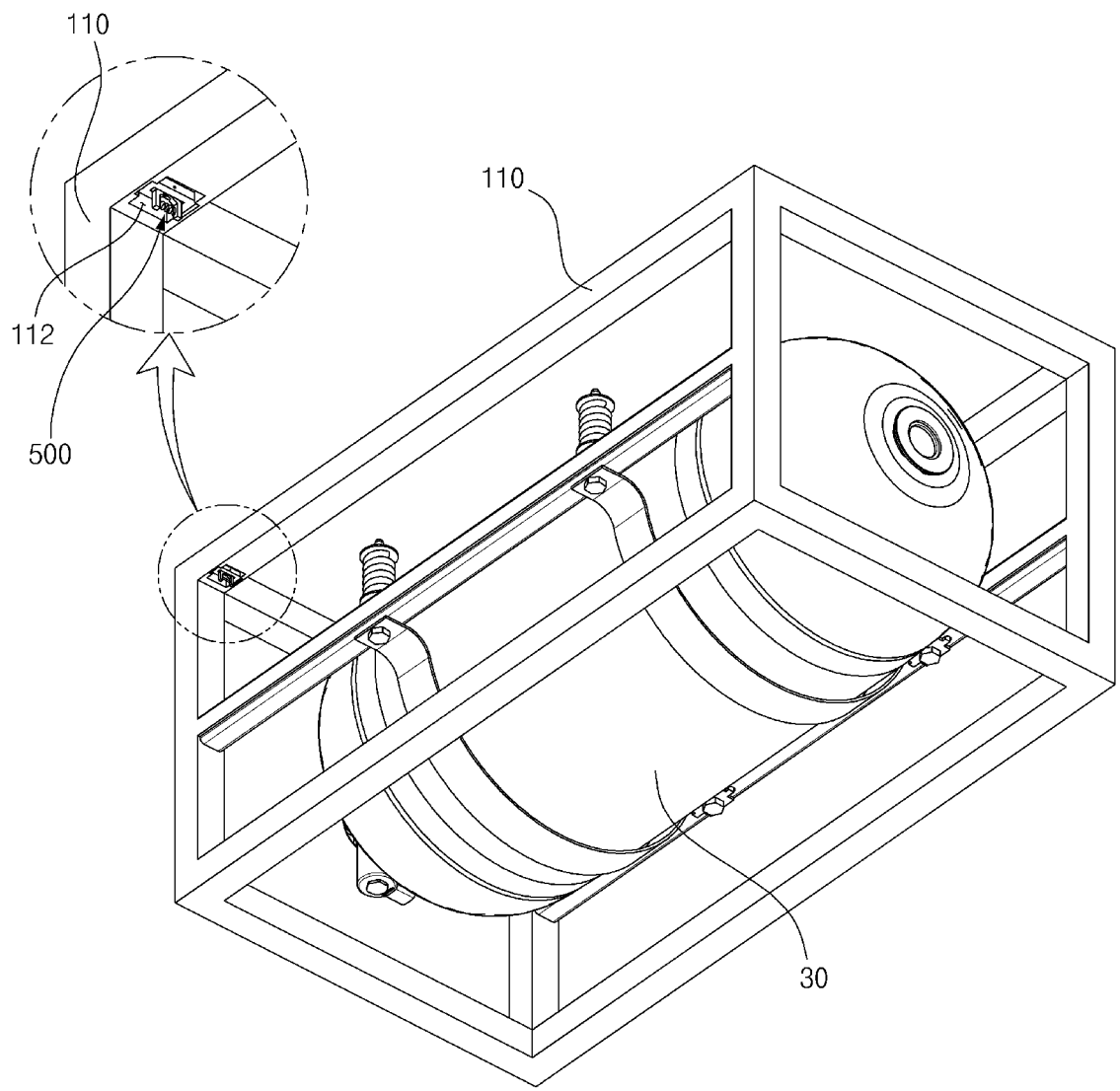
Figure 7:
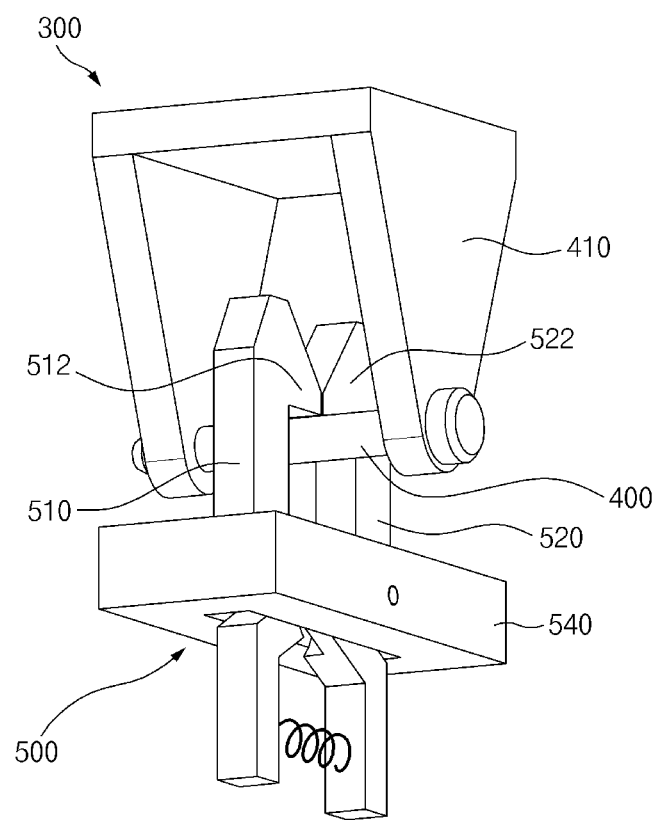
FIGS. 7 and 8 are views for explaining a locked state of a locking pin of the apparatus for fixing a pressure vessel according to the embodiment of the present disclosure.
Figure 8:
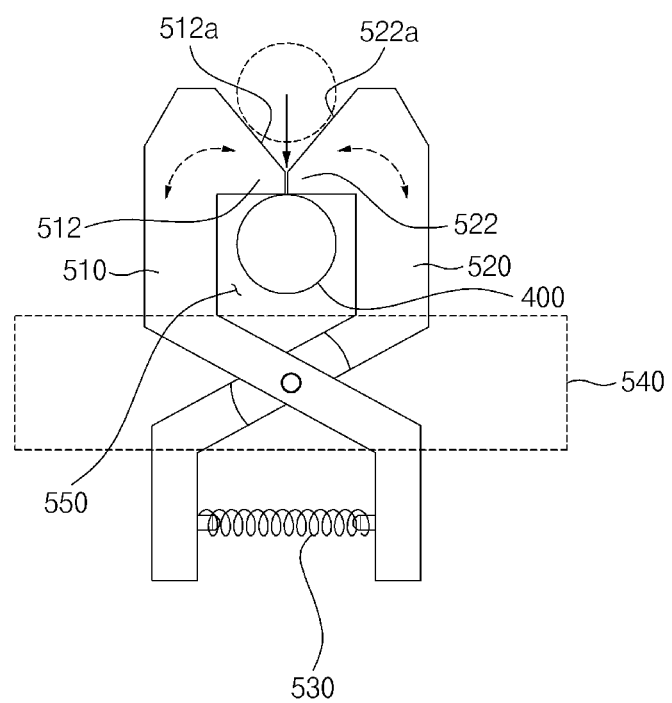

Referring to FIGS. 2 and 3, according to the exemplary embodiment of the present disclosure, the second frame member 120 may be moved between a first position at which the second frame member 120 is stacked on the upper portion of the first frame member 110 and a second position at which the second frame member 120 is disposed on the same layer as the first frame member 110.

In this case, the configuration in which the second frame member 120 moves from the first position to the second position may include both a configuration in which the second frame member 120 rotates (moves along a curved line) from the first position to the second position (or from the second position to the first position) and a configuration in which the second frame member 120 rectilinearly moves from the first position to the second position (or from the second position to the first position).

Hereinafter, an example will be described in which the second frame member 120 rotates from the first position to the second position.

In particular, the second frame member 120 is disposed at the same height as the first frame member 110 at the second position. In this case, the configuration in which the second frame member 120 is disposed at the same height as the first frame member 110 may means that a height of a top surface of the second frame is equal to a height of a top surface of the first frame member 110.

According to the exemplary embodiment of the present disclosure, the apparatus 10 for fixing the pressure vessel 30 may include hinge parts 200 configured to connect the first and second frame members 110 and 120 so that the first and second frame members 110 and 120 are rotatable. The second frame member 120 may rotate about the hinge parts 200 from the first position to the second position.

The hinge part 200 may have various structures capable of connecting the first and second frame members 110 and 120 so that the first and second frame members 110 and 120 are rotatable. The present disclosure is not restricted or limited by the structure of the hinge part 200.

For example, the hinge part 200 may include a first hinge bracket (not illustrated) connected to the first frame member 110, a second hinge bracket (not illustrated) connected to the second frame member 120, and a hinge shaft (not illustrated) configured to connect the first and second hinge brackets so that the first and second hinge brackets are rotatable.

Referring to FIGS. 4 to 8, according to the exemplary embodiment of the present disclosure, the apparatus 10 for fixing the pressure vessel 30 may include locking parts 300 configured to selectively lock the second frame member 120 to the first frame member 110 when the second frame member 120 is positioned at the first position.

This is to inhibit the movement (rotation) and separation of the second frame member 120 relative to the first frame member 110 and stably maintain the arrangement state of the second frame member 120 in the state in which the second frame member 120 is positioned at the first position.

That is, the foothold 600 is provided on the second frame member 120, and an operator works with his/her foot put on the foothold 600. Therefore, when the arrangement state of the second frame member 120 is not stably maintained, working stability of the operator deteriorates.

In contrast, according to the embodiment of the present disclosure, the second frame member 120 is locked to the first frame member 110 (the state in which the second frame member 120 is stacked on the upper portion of the first frame member 110 is maintained) by means of the locking part 300 when the second frame member 120 is positioned at the first position. Therefore, the arrangement state of the second frame member 120 may be stably maintained, and the arrangement state of the foothold 600 disposed on the second frame member 120 may be stably maintained. Therefore, it is possible to obtain an advantageous effect of improving the working stability of the operator who works with his/her foot put on the foothold 600.

The locking part 300 may have various structures capable of locking the second frame member 120 to the first frame member 110 when the second frame member 120 is positioned at the first position.

For example, the locking part 300 may include a locking pin 400 disposed on the second frame member 120, and a locking module 500 disposed on the first frame member 110 and configured to selectively lock the locking pin 400. Alternatively, the locking pin 400 may be disposed on the first frame member 110, and the locking module 500 may be disposed on the second frame member 120.

According to the exemplary embodiment of the present disclosure, the apparatus 10 for fixing the pressure vessel 30 may include a locking bracket 410 welded (or fastened) to a bottom surface of the second frame member 120 facing a top surface of the first frame member 110, and the locking bracket 410 protrudes from the bottom surface of the second frame member 120. The locking pin 400 may be supported on the locking bracket 410.

In the embodiment of the present disclosure illustrated and described above, the example has been described in which the locking pin 400 is mounted by the locking bracket 410 disposed on the second frame member 120. However, according to another embodiment of the present disclosure, the locking pin may be mounted directly on the second frame member 120 without a separate locking bracket.

The locking module 500 may have various structures capable of selectively locking the locking pin 400. The present disclosure is not restricted or limited by the structure of the locking module.

For example, the locking module 500 may include: a first locking member 510 rotatably disposed on the first frame member 110 and having a first locking protrusion 512 disposed at one end thereof; a second locking member 520 rotatably disposed on the first frame member 110 so as to intersect the first locking member 510 and having a second locking protrusion 522 disposed at one end thereof such that the first and second locking protrusions 512 and 522 collectively define a locking hole 550 for locking the locking pin 400; and an elastic member 530 configured to elastically support rotations of the first and second locking members 510 and 520 relative to the first frame member 110.

The first and second locking members 510 and 520 may operate (rotate) like scissors and selectively define the locking hole 550 for locking the locking pin 400.

More specifically, the first and second locking members 510 and 520 are rotatably coupled to the first frame member 110 so as to collectively define an approximately 'X' shape. When the first locking protrusion 512 disposed at one end of the first locking member 510 and the second locking protrusion 522 disposed at one end of the second locking member 520 move toward or away from each other, the locking hole 550 is closed (the locking pin 400 is locked) or opened (the locking pin 400 may enter or exit the locking hole 550).

For example, the first frame member 110 may have an accommodation portion 112 that may accommodate the locking bracket 410 therein. Since the locking bracket 410 is accommodated in the accommodation portion 112 as described above, the second frame member 120 may be in completely close contact with the first frame member 110 in the state in which the first frame member 110 is disposed at the first position. Therefore, it is possible to obtain an advantageous effect of more stably maintaining the arrangement state of the second frame member 120 (the state in which the second frame member 120 is disposed at the first position).

The elastic member 530 serves to elastically support the rotations of the first and second locking members 510 and 520 relative to the first frame member 110.

Various elastic members capable of elastically supporting the rotations of the first and second locking members 510 and 520 relative to the first frame member 110 may be used as the elastic member 530. The present disclosure is not restricted or limited by the type and structure of the elastic member 530. For example, a typical spring may be used as the elastic member 530.

For example, the elastic member 530 may be disposed between the other end of the first locking member 510 and the other end of the second locking member 520 and elastically compressed or extended. According to another embodiment of the present disclosure, one end of the elastic member may be connected to the first locking member (or the second locking member), and the other end of the elastic member may be connected to the first frame member.

According to the exemplary embodiment of the present disclosure, the apparatus 10 for fixing the pressure vessel 30 may include a base block 540 accommodated in the accommodation portion 112. The first and second locking members 510 and 520 may be rotatably coupled to the base block 540.

More particularly, a locking groove 112a for locking the base block 540 may be provided in the accommodation portion 112. As described above, the locking groove 112a is provided in the accommodation portion 112, and the base block 540 is locked by the locking groove 112a. Therefore, it is possible to obtain an advantageous effect of inhibiting the base block 540 from being separated from the first frame member 110 by a load and external force applied to the second frame member 120 (the locking pin).

According to the exemplary embodiment of the present disclosure, the apparatus 10 for fixing the pressure vessel 30 may include a first inclined guide portion 512a formed on the first locking protrusion 512 and configured to guide the locking pin 400 to the locking hole 550, and a second inclined guide portion 522a formed on the second locking protrusion 522 and configured to guide the locking pin 400 to the locking hole 550.

The first and second inclined guide portions 512a and 522a may be variously changed in lengths and inclination angles in accordance with required conditions and design specifications (e.g., a size of the locking pin). The present disclosure is not restricted or limited by the lengths and inclination angles of the first and second inclined guide portions 512a and 522a.

As described above, the first and second inclined guide portions 512a and 522a are respectively provided on the first and second locking protrusions 512 and 522. Therefore, when the locking pin 400 approaches the first and second locking protrusions 512 and 522, the locking pin 400 may move along the first and second inclined guide portions 512a and 522a, such that the rectilinear movement of the locking pin 400 may be converted into the rotations of the first and second locking protrusions 512 and 522 (the rotations of the first and second locking members 510 and 520), and the locking pin 400 may be accommodated in the locking hole 550 through a gap between the first and second locking protrusions 512 and 522.

After the locking pin 400 is completely accommodated in the locking hole 550, the first and second locking members 510 and 520 are rotated by an elastic force of the elastic member 530 in a direction opposite to the direction in which the first and second locking members 510 and 520 rotate to open the locking hole 550. Therefore, the first and second locking protrusions 512 and 522 approach each other to close the locking hole 550 (the locking pin 400 is locked).

The foothold 600 is disposed on the frame part 100 and provides a stepping region on which the operator may put his/her foot.

For example, the footholds 600 may be respectively disposed on the first frame member 110, the second frame member 120, and the third frame member 130. The first frame member 110, the second frame member 120, and the third frame member 130 may not only serve to support the pressure vessels 30 but also serve as foothold frames for supporting the footholds 600.

The foothold 600 may be made of various materials and have structures in order to form the stepping region. The present disclosure is not restricted or limited by the material and structure of the foothold 600.

For example, the foothold 600 may be provided in the form of an approximately quadrangular plate made of a metallic material. According to another embodiment of the present disclosure, the foothold may have a circular shape, a triangular shape, or other shapes.

The structure for fixing the foothold 600 may be variously changed in accordance with required conditions and design specifications. For example, the footholds 600 may be fixed to the first frame member 110, the second frame member 120, and the third frame member 130 by means of fastening members such as bolts. Alternatively, the foothold may be coupled to the corresponding frame member by welding or sliding coupling.

Figure 9:
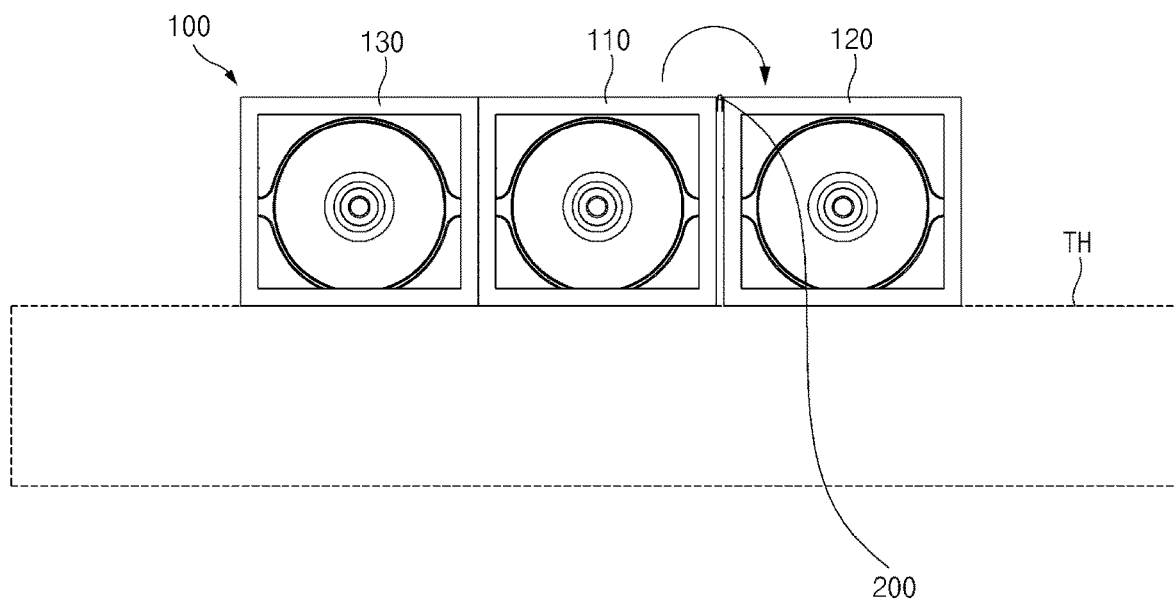
FIG. 9 is a view for explaining a state in which a second frame member of the apparatus for fixing a pressure vessel according to the embodiment of the present disclosure is disposed at a second position.

Referring to FIG. 9, the second frame member 120 may be disposed at the second position so that the first and second frame members 110 and 120 are disposed on the single layer at the time of moving (transporting) the pressure vessels 30 to a transport vehicle TH to change the pressure vessels 30, for example.

As described above, the first frame member 110, the second frame member 120, and the third frame member 130, which constitute the frame part 100, are disposed on the single layer at the time of transporting the pressure vessels 30. Therefore, it is possible to obtain an advantageous effect of more densely loading the plurality of frame parts 100, minimizing the loading space, and improving the ability and stability to load the frame part 100 (the pressure vessels).

Figure 10:
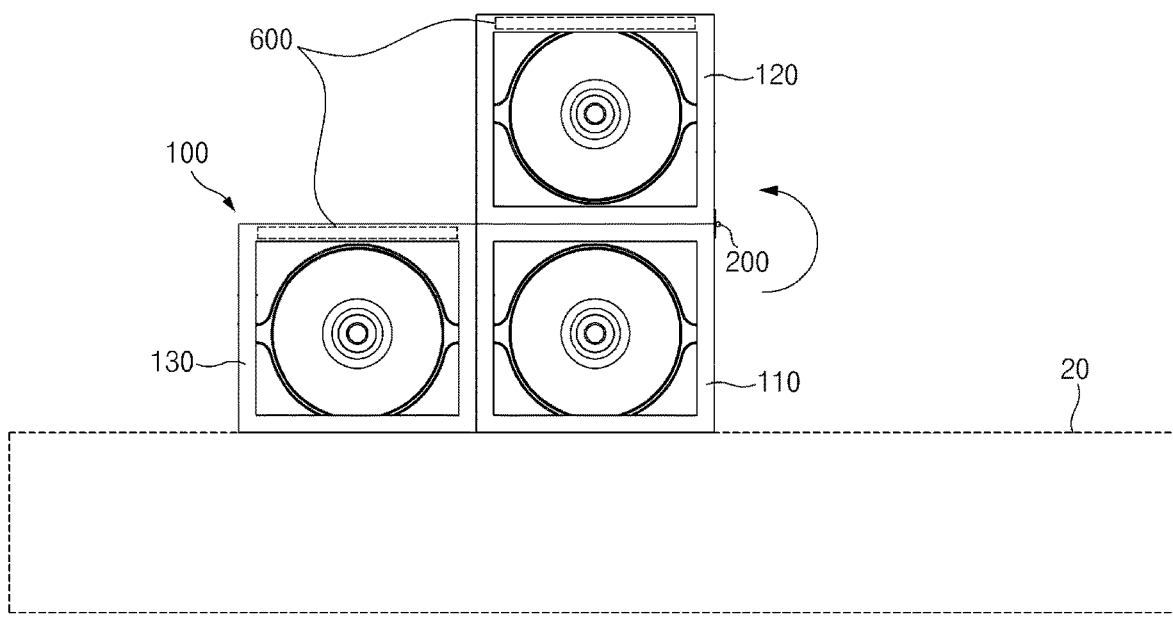
FIG. 10 is a view for explaining a state in which the second frame member of the apparatus for fixing a pressure vessel according to the embodiment of the present disclosure is disposed at a first position.

In contrast, referring to FIG. 10, the second frame member 120 may be stacked on the upper portion of the first frame member 110 at the time of mounting the pressure vessels 30 on the subject 20 such as a construction machine.

As described above, the second frame member 120 is stacked on the upper portion of the first frame member 110 at the time of mounting the pressure vessels 30 on the subject 20 such as a construction machine. Therefore, the first frame member 110, the second frame member 120, and the third frame member 130 may be disposed collectively in a stepwise manner, and the foothold 600 disposed on the third frame member 130 may be disposed in a stepwise manner to have a level difference from the foothold 600 disposed on the second frame member 120. Therefore, the first frame member 110, the second frame member 120, and the third frame member 130 may not only serve to support and protect the pressure vessels 30 but also serve as the foothold frame for supporting the foothold 600.

According to the present disclosure described above, it is possible to obtain an advantageous effect of simplifying the structure and improving the degree of design freedom and spatial utilization.

In particular, according to the embodiment of the present disclosure, the frame part may not only serve to support the pressure vessels but also serve to support the foothold (serve as the foothold frame). Therefore, no frame for supporting the foothold need to be added, which makes it possible to obtain an advantageous effect of simplifying the structure and improving the degree of design freedom and spatial utilization.

In addition, according to the embodiment of the present disclosure, it is possible to obtain an advantageous effect of densely loading the plurality of pressure vessels, minimizing the loading space, and improving the ability and stability to load the pressure vessels.

In addition, according to the embodiment of the present disclosure, it is possible to obtain an advantageous effect of stably maintaining the arrangement state of the pressure vessels, improving the stability and reliability, and reducing a risk of occurrence of a safety accident.

In addition, according to the embodiment of the present disclosure, it is possible to obtain an advantageous effect of supplementing fuel in a timely manner without limitation in respect to a workplace or a fuel charging station.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. An apparatus for fixing pressure vessels, which fixes the pressure vessels to a subject, the apparatus comprising:
   a frame part disposed to be separable from the subject and configured to support the pressure vessels; and
   a foothold disposed on the frame part,
   wherein the frame part comprises:
   a first frame member; and
   a second frame member disposed to be movable via a connector between a first position at which the second frame member is stacked on an upper portion of the first frame member and a second position at which the second frame member is disposed on a same layer as the first frame member, and
   wherein the pressure vessels are respectively disposed on the first and second frame members, and the foothold is disposed on the second frame member.

2. The apparatus of claim 1, wherein the second frame member is disposed at a same height as the first frame member at the second position.

3. The apparatus of claim 1, comprising:
   wherein said connector is a hinge part configured to connect the first and second frame members to each other so that the first and second frame members are rotatable with respect to each other,
   wherein the second frame member rotates about the hinge part from the first position to the second position.

4. The apparatus of claim 1, comprising:
   a locking part configured to selectively lock the second frame member to the first frame member when the second frame member is positioned at the first position.

5. The apparatus of claim 4, wherein the locking part comprises:
   a locking pin disposed on the second frame member; and
   a locking module disposed on the first frame member and configured to selectively lock the locking pin.

6. The apparatus of claim 5, wherein the locking module comprises:
   a first locking member rotatably disposed on the first frame member and having a first locking protrusion disposed at one end thereof;
   a second locking member rotatably disposed on the first frame member so as to intersect the first locking member and having a second locking protrusion disposed at one end thereof such that the first and second locking protrusions collectively define a locking hole for locking the locking pin; and
   an elastic member configured to elastically support rotations of the first and second locking members relative to the first frame member.

7. The apparatus of claim 6, comprising:
   a first inclined guide portion included in the first locking protrusion and configured to guide the locking pin to the locking hole; and
   a second inclined guide portion included in the second locking protrusion and configured to guide the locking pin to the locking hole.

8. The apparatus of claim 6, comprising:
   a locking bracket protruding from a bottom surface of the second frame member facing a top surface of the first frame member at the second position,
   wherein the locking pin is supported by the locking bracket.

9. The apparatus of claim 8, wherein the first frame member has an accommodation portion that accommodates the locking bracket therein.

10. The apparatus of claim 9, comprising:
    a base block accommodated in the accommodation portion,
    wherein the first and second locking members are rotatably coupled to the base block.

11. The apparatus of claim 10, wherein the accommodation portion of the first frame member includes a locking groove configured to lock the base block.

12. The apparatus of claim 1, wherein the frame part further comprises a third frame member disposed at one side of the first frame member such that the third frame member is disposed on the same layer as the first frame member, and a foothold disposed on the third frame member is disposed to have a level difference from the foothold disposed on the second frame member.

13. The apparatus of claim 1, wherein the subject comprises a construction machine.

* * * * *